US009417865B2

(12) United States Patent
Vidal et al.

(10) Patent No.: US 9,417,865 B2
(45) Date of Patent: Aug. 16, 2016

(54) DETERMINING WHEN TO UPDATE A PACKAGE MANAGER SOFTWARE (75) Inventors: Seth Kelby Vidal, Raleigh, NC (US); James Antill, Bristol, CT (US)

(73) Assignee: Red Hat, Inc., Raleigh, NC (US)

( * ) Notice: Subject to any disclaimer, the term of this patent is extended or adjusted under 35 U.S.C. 154(b) by 725 days.

(21) Appl. No.: 12/790,752

(22) Filed: May 28, 2010

(65) Prior Publication Data
US 2011/0296398 A1     Dec. 1, 2011

(51) Int. Cl.
*G06F 9/445*     (2006.01)
*G06F 9/44*      (2006.01)

(52) U.S. Cl.
CPC .. *G06F 8/65* (2013.01); *G06F 8/71* (2013.01); *G06F 8/61* (2013.01); *G06F 8/68* (2013.01)

(58) Field of Classification Search
None
See application file for complete search history.

(56) References Cited

U.S. PATENT DOCUMENTS

| | | | | |
|---|---|---|---|---|
| 6,353,928 | B1 * | 3/2002 | Altberg | G06F 8/61 717/175 |
| 6,438,749 | B1 | 8/2002 | Chamberlain | |
| 6,912,711 | B1 * | 6/2005 | Curtis et al. | 717/173 |
| 7,240,336 | B1 | 7/2007 | Baker | |
| 7,440,571 | B2 * | 10/2008 | Sasselli et al. | 380/264 |
| 7,512,939 | B2 | 3/2009 | Brookner | |
| 7,624,393 | B2 | 11/2009 | Egan et al. | |
| 7,657,885 | B2 | 2/2010 | Anderson | |
| 7,735,057 | B2 * | 6/2010 | Rachman et al. | 717/100 |
| 7,836,341 | B1 | 11/2010 | Krishnan | |
| 2003/0051235 | A1 | 3/2003 | Simpson | |
| 2003/0229890 | A1 | 12/2003 | Lau et al. | |
| 2004/0107349 | A1 * | 6/2004 | Sasselli et al. | 713/176 |
| 2004/0230971 | A1 * | 11/2004 | Rachman et al. | 717/175 |
| 2005/0210459 | A1 | 9/2005 | Henderson et al. | |
| 2006/0059481 | A1 * | 3/2006 | Smith | G06F 8/65 717/173 |
| 2006/0190773 | A1 | 8/2006 | Rao et al. | |
| 2006/0230398 | A1 | 10/2006 | Yokota | |
| 2007/0038991 | A1 | 2/2007 | Schuft et al. | |
| 2007/0157192 | A1 | 7/2007 | Hoefler et al. | |
| 2007/0169075 | A1 | 7/2007 | Lill et al. | |
| 2008/0028385 | A1 * | 1/2008 | Brown | G06F 8/65 717/170 |
| 2008/0134165 | A1 | 6/2008 | Anderson et al. | |
| 2008/0141240 | A1 | 6/2008 | Uthe | |

(Continued)

OTHER PUBLICATIONS

Uninstalling previous Version when installing New Version, Advanced Installer Forums, May 11, 2009, 4 pages, [retrieved on Apr. 8, 2016], Retrieved from the Internet: <URL:http://www.advancedinstaller.com/forums/viewtopic.php?t=9023>.*

(Continued)

*Primary Examiner* — Thuy Dao
*Assistant Examiner* — Geoffrey St Leger
(74) *Attorney, Agent, or Firm* — Lowenstein Sandler LLP (57) ABSTRACT

Updating package manager software on a client. An update tool can interface with a package manager running a first version of the package manager software to inspect an available update to a package installed on the client. The update tool can determine that a second version of the package manager software is required to install the update to the package. The update tool can access the second version of the package manager software, remove the first version of the package manager software from the package manager, and unpack and install the second version of the package manager software on the package manager. Further, the update tool can install the update to the package installed on the client, and can update other resources associated with the client as appropriate.

15 Claims, 5 Drawing Sheets

(56) References Cited

U.S. PATENT DOCUMENTS

| | | | |
|---|---|---|---|
| 2008/0201705 A1 | 8/2008 | Wookey | |
| 2009/0013319 A1 | 1/2009 | Williams et al. | |
| 2009/0037897 A1 | 2/2009 | Dull et al. | |
| 2009/0133014 A1* | 5/2009 | Laurila et al. | 717/174 |
| 2009/0187901 A1* | 7/2009 | Kanai | G06F 8/65 717/173 |
| 2009/0300595 A1 | 12/2009 | Moran et al. | |
| 2010/0023933 A1 | 1/2010 | Bryant et al. | |
| 2010/0058308 A1 | 3/2010 | Demshur et al. | |
| 2010/0058314 A1 | 3/2010 | Wang | |
| 2010/0083243 A1 | 4/2010 | Mincarelli et al. | |
| 2011/0138374 A1* | 6/2011 | Pal | 717/169 |
| 2011/0197175 A1* | 8/2011 | Bouz | G06F 8/71 717/107 |

OTHER PUBLICATIONS

UK International Keyboard Layout, Mar. 24, 2009, 4 pages, [retrieved on Apr. 6, 2016], Retrieved from the Internet: <URL:https://web.archive.org/web/20090324151551/http://www.chiark.greenend.org.uk/~johns/kbukint.html>.*

Seth Kelby Vidal, "Systems and Methods for Initiating Software Repairs in Conjuction With Software Package Updates", U.S. Appl. No. 12/714,200, filed Feb. 26, 2010.

Seth Kelby Vidal, "Systems and Methods for Diagnostic Notification via Package Update Manager", U.S. Appl. No. 12/714,258, filed Feb. 26, 2010.

Seth Kelby Vidal, "Systems and Methods for Managing Software Package Updates Using Communication Pipes", U.S. Appl. No. 12/714,208, filed Feb. 26, 2010.

Seth Kelby Vidal, "Systems and Methods for Generating and Storing Translation Information as Package Metadata", U.S. Appl. No. 12/714,171, filed Feb. 26, 2010.

Seth Kelby Vidal, "Systems and Methods for Generating Predictive Diagnostics via Package Update Manager", U.S. Appl. No. 12/714,222, filed Feb. 26, 2010.

James Antlll, "Systems and Methods for Defining and Enforcing Access Policy for Package Update Processes", U.S. Appl. No. 12/873,850, filed Sep. 1, 2010.

Seth Kelby Vidal, "Systems and Methods for Generating Cached Representations of Encoded Package Profile", U.S. Appl. No. 12/788,139, filed May 26, 2010.

Seth Kelby Vidal, "Systems and Methods for Generating Cached Representations of Host Package Inventories in Remote Package Repositories", U.S. Appl. No. 12/790,699, filed May 28, 2010.

Seth Kelby Vidal, "Systems and Methods for Generating Package Profiles in Software Package Repositories Using Selective Subsets of Packages", U.S. Appl. No. 12/873,557, filed Sep. 1, 2010.

Seth Kelby Vidal, "Systems and Methods for Generatinig an Encoded Package Profile Based on Executing Host Processes", U.S. Appl. No. 12/787,104, filed May 26, 2010.

Seth Kelby Vidal, "Systems and Methods for Restoring Machine State History Related to Detected Faults in Package Update Process", U.S. Appl. No. 12/788,036, filed May 26, 2010.

Seth Kelby Vidal, "Systems and Methods for Generating Client Qualification to Execute Package Update Manager", U.S. Appl. No. 12/788,458, filed May 27, 2010.

Seth Kelby Vidal, "Systems and Methods for Managing Versions of Software Packages", U.S. Appl. No. 13/037,363, filed Mar. 1, 2011.

Seth Kelby Vidal, "Systems and Methods for Generating Exportable Encoded Identifications of Networked Machines Based on Installed Package Profiles", U.S. Appl. No. 12/768,416, filed Apr. 27, 2010.

Seth Kelby Vidal, "Systems and Methods for Tracking Computing Systems Utilizing Software Repositories", U.S. Appl. No. 12/955,671, filed Nov. 29, 2010.

Seth Kelby Vidal, "Systems and Methods for Automatic Upgrade and Downgrade in Package Update Operations", U.S. Appl. No. 12/892,227, filed Sep. 28, 2010.

Seth Kelby Vidal, "Systems and Methods for Detection of Malicious Software Packages", U.S. Appl. No. 12/898,876, filed Oct. 6, 2010.

Seth Kelby Vidal, "Systems and Methods for Space Efficient Software Package Management", U.S. Appl. No. 12/610,006, filed Oct. 30, 2009.

* cited by examiner

DETERMINING WHEN TO UPDATE A PACKAGE MANAGER SOFTWARE

FIELD

The present teachings relate to systems and methods for determining when to update a package manager software, and more particularly, to platforms and techniques for ensuring compatibility between a package manager software and an update to resources installed on a client.

BACKGROUND OF RELATED ART

A package management system can facilitate the process of installing, upgrading, configuring, and removing software packages associated with a client computer. The software packages can contain a set of related files chosen to perform a given application or task, such as, for example, a group of software applications, drivers, and/or other resources used to install and use messaging or media applications. In instances, a software package can contain application software, operating system software, drivers, patches, and/or other software components grouped as a logical set. In implementations, the package can be stored or encoded as a single file or data object.

Package managers exist to help a user initiate and perform software package updates, such as, for example, the "yum" (Yellowdog update manager) package manager available from Red Hat™, Inc., Raleigh, N.C., and others. In general, available package managers are configured to interact with the set of installed software packages on a client and with one or more software package repositories, to directly connect to those databases and download available package updates.

The package manager itself can have a software version to facilitate the software package updates. Over time, updated versions for the package manager software can be developed to accommodate changes in software packages or software repositories. However, the ability to update the software packages can depend on a certain version of the package manager software being installed on a client. It may therefore be desirable to provide systems and methods for determining when to update a package manager software to ensure compatibility between a package manager software and an update to resources installed on the client. Further, it may be desirable to update the package manager software without impacting the associated packages and resources.

DESCRIPTION OF DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for determining when to update a package manager software. More particularly, embodiments relate to platforms and techniques for ensuring compatibility between a package manager software and an update to application packages and/or other packages or resources installed on a client. In embodiments, the package manager can employ a first version of a package manager software and use the first version to access, download, or otherwise obtain a second version of the package manager software. An update tool associated with the package manager can inspect an update to a package installed on the client and can determine that the update to the package requires that the second version of the package manager software be installed on the client. The update tool can unpack and install the second version of the package manager software on the package manager. Further, the update tool can update, using the second version of the package manager software, the package installed on the client and other associated resources of the client that may be needed for compatibility with or to support the execution of the second version of the package manager software.

The update tool can inspect, detect, diagnose, or otherwise determine any potential conflicts, bugs, faults, and/or other conditions, and causes thereof, of a package manager software update or other package updates. Further, the update tool can generate a notification to the user of those potential update issues. In embodiments, the notification can indicate that a dependency issue exists before a further update can be performed, such as that a specific version of the package manager software needs to be installed in order for a package already installed on the client to be updated. In further embodiments, the notification can include an indication of which resources associated with the client need to be updated to support the specific version of the package manager software. A user can then confirm, discontinue, change, or retry any processing associated with the package manager software update. For example, the user can choose to update the package manager software and continue with applicable package updates. Further, the user can choose to discontinue with the package manager software or other packages updates if, for example, the updates may produce an undesirable result. These and other embodiments described herein address the various noted shortcomings in known package manager software update technology, and provide more capability for unpacking and installing new versions of package manager software or updates to other packages with less potential for software or hardware conflicts, errors, or other undesirable results of updating activity.

As used herein, "package manager" can be a tool or collection of tools or resources configured to install, unpack, upgrade, configure, or remove software packages from a client computer. Further, as used herein, "package manager software" can be an application, software, or set of files executing in conjunction with the package manager to facilitate the functions of the package manager. For example, the "yum" package manager available from Red Hat™, Inc., and others, can have an associated version for its package manager software. Further, the package manager software can be updated when there is a subsequent version available.

Reference will now be made in detail to exemplary embodiments of the present teachings, which are illustrated in the accompanying drawings. Where possible the same reference numbers will be used throughout the drawings to refer to the same or like parts.

Figure 1:
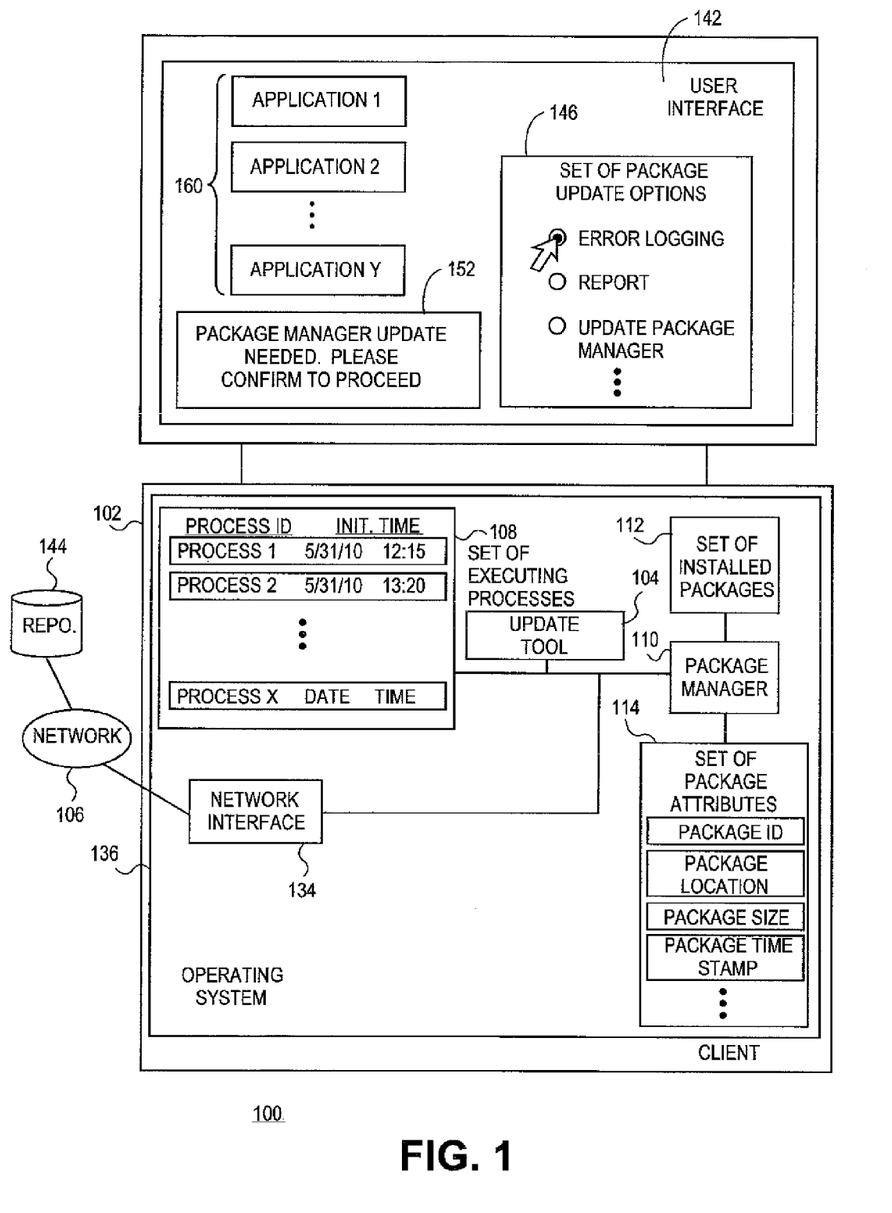
FIG. 1 illustrates an overall network in which systems and methods for determining when to update a package manager software can be implemented, according to various embodiments.

FIG. 1 illustrates an exemplary system 100 in which systems and methods for determining when to update a package manager software can be implemented. In embodiments as shown, a client 102 can store, execute, and otherwise host a variety of resources including a package manager 110 configured to communicate with a set of installed software packages 112, and other hardware, software, and resources. In embodiments, package manager 110 can be or can include a software application, a utility, an application programming interface (API) to an operating system 136 of client 102, a service, and/or other local or remote logic or resources. According to embodiments, package manager 110 can access and manage set of installed software packages 112 to run, edit, update, configure, and/or otherwise manage one or more software packages hosted or installed in client 102. In embodiments, package manager 110 can be or can include one or more commercially and/or publicly available package manager applications or resources, such as the "yum" package update manager available from Red Hat™, Inc., or others, based on or compatible with the Red Hat™, Inc. package manager (rpm) platform, or others.

In embodiments, set of installed software packages 112 can be or include packages comprising various types of applications 160, such as, for example, messaging applications, spreadsheet or modeling applications, social networking applications, word processing applications, and/or other applications or utilities, and can in embodiments include an operating system, drivers, and/or components. Set of installed software packages 112 can have an associated set of package attributes 114 which can record file names, versions, dates, software requirements, and/or other attributes related to each of set of installed software packages 112 or to the package manager software.

Package manager 110 can communicate with a network interface 134 configured to connect to one or more networks 106, such as the public Internet or other public or private networks. Package manager 110 can thereby connect to one or more package repositories 144 hosting software packages including package updates, package manager software updates, and/or other software or resources.

Package manager 110 can also interact and/or communicate with set of installed software packages 112 and one or more package repositories 144 to initiate, configure, test, update, and/or otherwise manage set of installed software packages 112 operating on client 102. Package manager 110 can, for example, provide a user with a set of package update options 146 displayed via user interface 142, such as a graphical user interface or others, to select various test, configuration, and/or other management activities on set of installed software packages 112. For example, a user can select to initiate an update on one or more packages of set of installed software packages 112, install a new package update on client 102, or update an installed package manager software via user interface 142.

According to embodiments, package manager 110 can communicate with an update tool 104 hosted on client 102, to determine compatibility issues between updates to set of installed software packages 112 and an installed version of the package manager software. It should be appreciated that update tool 104 can be a standalone entity or resource, or can be integrated as part of package manager 110. In embodiments, update tool 104 can determine potential instabilities of resources on client 102 associated with unpacking and installing a new version of a package manager software. Update tool 104 can update client resources to alleviate the potential instabilities, such as, for example, by installing new application versions, software patches, and similar updates to resources.

In embodiments, update tool 104 can generate reports and notifications regarding a potential instability, one or more causes of the potential instability and categories thereof, or other conditions of package manager software update activities conducted on client 102. By determining the one or more causes of the potential instabilities, a user can be notified of future potential instabilities or other conditions that might be caused by updating a package manager software or other packages. Update tool 104 can record diagnostic information such as, for example, the one or more causes of the potential instabilities, origins of the one or more causes, and other data. Update tool 104 can also contain or access diagnostic logic to examine data generated or hosted by various resources, including set of installed software packages 112, operating system 136, or one or more repositories 144 to generate user notifications and other output to support and manage the updating of package manager software or other packages.

Figure 2:
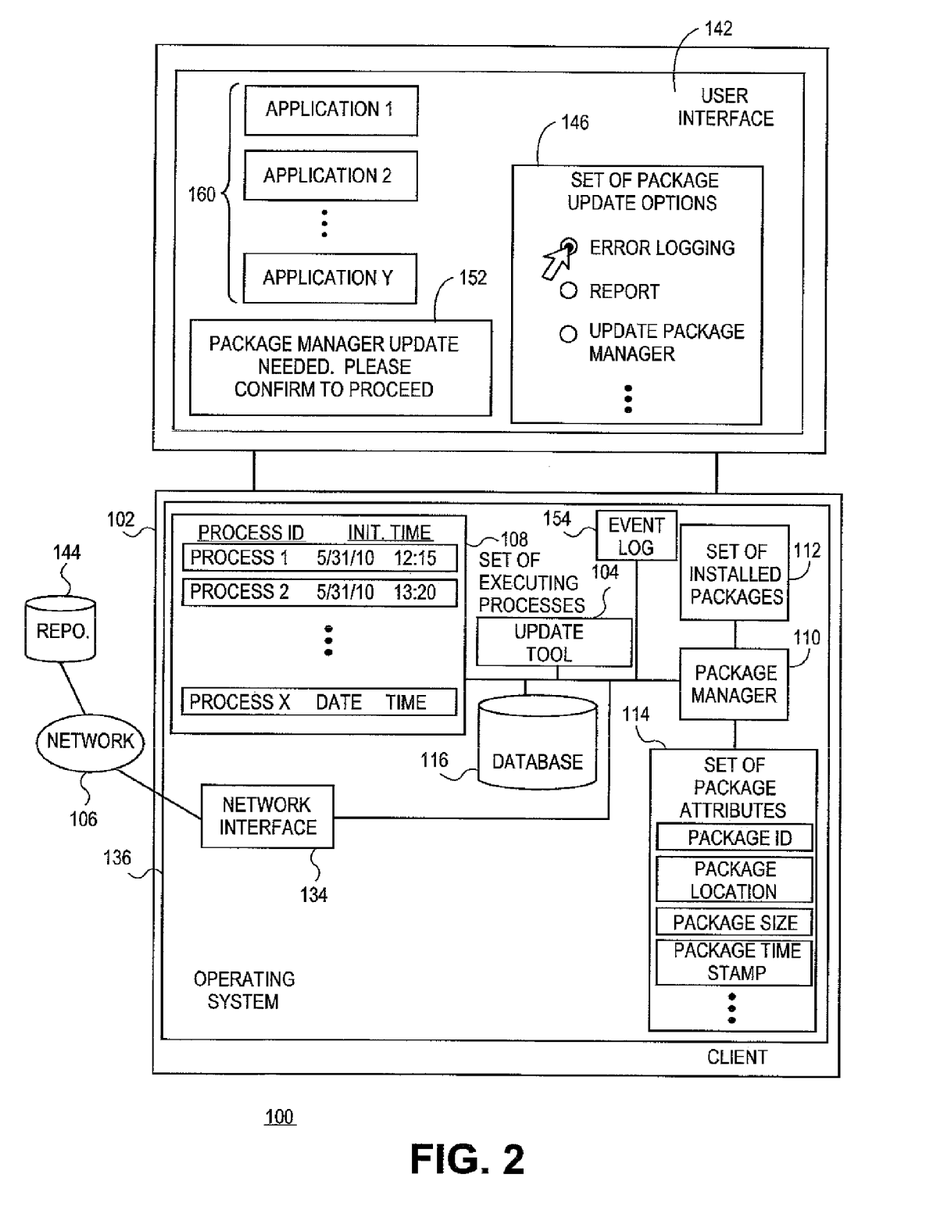
FIG. 2 illustrates another example of the overall network in which systems and methods for determining when to update a package manager software can be implemented, according to various embodiments in further regards.

As illustrated, for example, more particularly in FIG. 2, package manager 110 can connect to one or more package repositories 144 via one or more networks 106. Package manager 110 can present and manage set of update options 146 to initiate and conduct download activity, for example to initiate the download of one or more package updates. According to embodiments, update tool 104 can interface with package manger 110 running a first version of package manager software. Further, update tool 104 can identify an update to one of set of installed software packages 112. Update tool 104 can inspect the package update for an indication that a second (or other) version of the package manager software needs to be installed on package manager 110 for the package update to be installed. In embodiments, the package update can be made available in one or more package repositories 144, and can be accessed and inspected by update tool 104 via network 106. Further, in embodiments, the package update can comprise associated metadata that can indicate a version requirement for the package manager software. For example, the metadata of the package update can indicate that the second version of the package manager software is required to install the package update.

Update tool 104, package manager 110 and/or other logic can facilitate the update of a software version of package manager 110 itself. For example, package manager 110, executing on the first version of a package manager software, can connect to one or more package repositories 144 to access, download, or otherwise obtain the second version of the package manager software. In embodiments, the second version of the package manager software can be encompassed in a software package. In embodiments, the second version of the package manager software can be one or more version numbers or iterations from the first version of the package manager software. For example, there can be multiple update versions of the package manager software that were released between the releases of the first version and the second version. Further, in embodiments, the systems and methods can be configured to unpack and install the most recent version of the package manager software that is also compatible with resources of or updates to set of installed software packages 112 on client 102. For example, if a version 10.0 of a package manager software is both available and compatible with updates to set of installed software packages 112, a version 9.5 that is compatible with the updates to set of installed software packages 112 but not available, and a version 9.0 of the package manager software is available but not compatible with the updates to set of installed software packages 112, then update tool 104, package manager 110, or other logic can access the version 10.0 for unpacking and installation on package manager 110.

Update tool 104 can, using the first version of the package manager software, unpack and install the second version of the package manager software on package manager 110. In embodiments, update tool 104 can remove files or data associated with the first version of the package manager software from package manager 110, client 102, or other components thereof. In response to unpacking and installing the second version of the package manager software, update tool 104 can install the update to the applicable one or more set of installed software packages 112 that require the second version of the package manager software.

In embodiments, update tool 104 and/or other logic can examine the second version of the package manager software to determine a set of resources on client 102 for which an update is necessary to support the second version of the package manager software. In embodiments, update tool 104 can examine metadata contained in the package received from the one or more package repositories 144 for indications of resource update information. Further, in embodiments, update tool 104 can determine the set of resources automatically by, for example, examining current and future dependencies between the package manager software and the set of resources.

Update tool 104 can update the determined set of resources on client 102. In embodiments, update tool 104 can retrieve files or data necessary for the update of the set of resources from the software package received from the one or more package repositories 144. In further embodiments, update tool 104 can retrieve files or data necessary for the update of the set of resources from local memory such as a database 116 or from a network location accessible by network 106. Further, in embodiments, update tool 104 can remove outdated files or data associated with the updated set of resources. In embodiments, files or data associated with the updated set of resources can be removed at any point after updating the package manager software and/or the one or more set of installed software packages 112. In embodiments, update tool 104 and/or other logic can create and/or maintain an event log 154 to store update events on client 102. For example, event log 154 or other records may indicate an update to the software package manager, set of installed software packages 112, or one or more resources on client 102 necessary to support any associated updates.

In embodiments, update tool 104 can be configured to handle any failures in the accessing, unpacking, or installing of the second version of the package manager software or the update to the applicable one or more set of installed software packages 112. For example, update tool 104 can be configured to revert any resources associated with client 102 back to a previous state, such as the state that the resources were in prior to the update attempt. Further, update tool 104 can reinstall a prior version of a package manager software if an installation of a newer version of the package manager software fails. It should be appreciated that other failure handling mechanisms are envisioned, such as, for example, reverting only some, or none, of the resources associated with the client, and other mechanisms.

According to embodiments, update tool 104 and/or other logic can provide one or more notifications 152 to users of client 102. For example, notification 152 can contain an indication that a new version of the package manager software needs to be installed in order to update one or more set of installed software packages 112. Further, for example, notification 152 can contain information regarding which resources on client 102 need to be updated to support the second version of the package manager software. In embodiments, notification 152 can contain an indication of the success or failure of an update associated with the embodiments as described herein. Other types of conditions related to the state of client 102 and its resources, as well as set of installed software packages 112 and other resources, can be identified and reported to the user via one or more notifications 152.

According to other embodiments, update tool 104 can identify and generate notifications automatically, and/or, can generate notifications, updates, and/or other activity based on user configuration settings, such as selections to display or suppress the display of selected notifications, and/or to automatically perform selected update actions or other processes, as described herein. In embodiments, update tool 104 can generate one or more notifications 152 before, during, or after the update of the package manager software. When generating notifications, update tool 104 can access other data resources, such as database 116, that can contain for example monitored or recorded system data. According to embodiments, update tool 104 can utilize data stored in database 116 for use during future package manager software updates.

Figure 3:
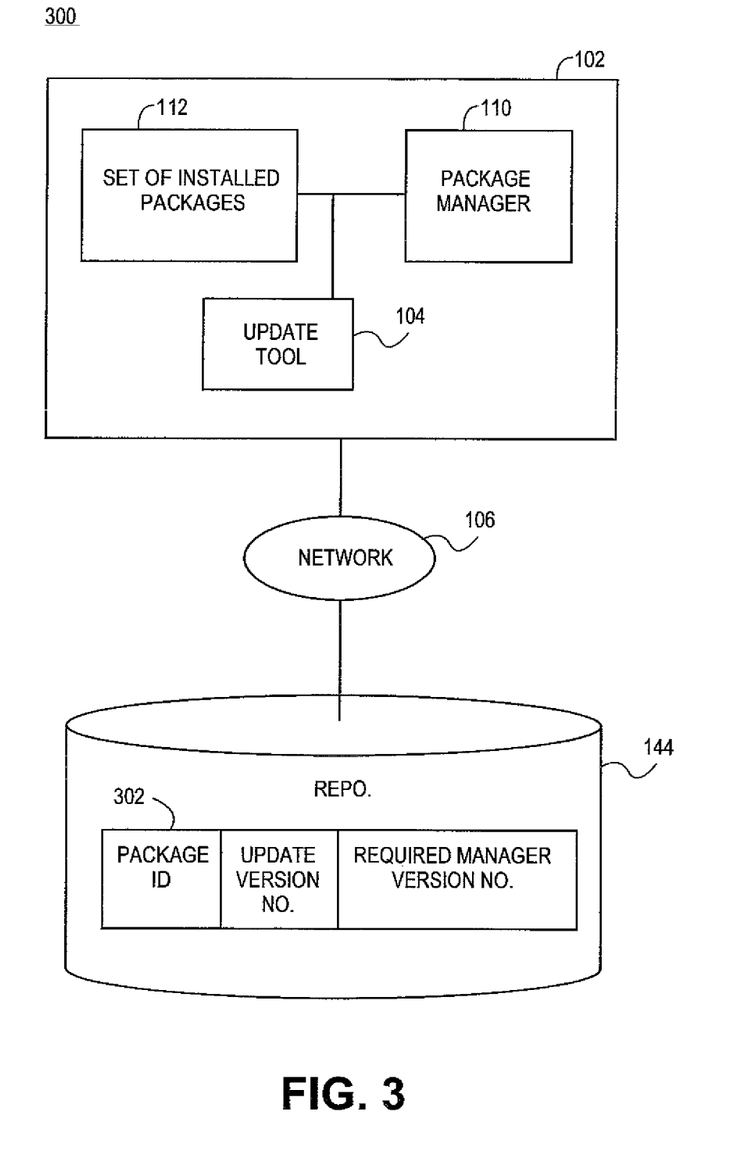
FIG. 3 illustrates an exemplary detailed network in which systems and methods for determining when to update a package manager software can be implemented, according to various embodiments in further regards.

FIG. 3 illustrates a detailed exemplary system 300 comprising similar components to those of system 100 as described in accordance with FIGS. 1 and 2, in which systems and methods for determining when to update a package manager software can be implemented. System 300 can comprise client 102 and one or more package repositories 144, as described herein. Client 102 can comprise package manager 110, set of installed software packages 112, and update tool 104, as described herein. Update tool 104 or other logic can access one or more package repositories 144 via network 106, as described herein. One or more package repositories 144 can comprise one or more package updates 302 that can correspond to available updates to one or more of set of installed software packages 112. For example, if a package of set of installed software packages 112 has an update available, the update can be made available in one or more package repositories 144. In embodiments, update tool 104 or other logic can download one or more package updates 302 to client 102 before inspecting and/or accessing the contents.

One or more package updates 302 can each have a set of associated attributes. For example, as shown, the set of attributes can comprise a package ID, an update version number, and a required package manager version number. In embodiments, the package ID and the update version number can identify which package is to be updated and the associated version number of the update, respectfully. Further, in embodiments, the required package manager version number can specify the version of the package manager software that is required to update the package specified by the package ID. For example, if the current package manager software version is 2.0, there is a package installed on client 102 with an update available, and the required package manager version number of the available update specifies that version 3.0 of the package manager software version is required to install the update to the package, then the available update for the package cannot be installed on client 102 without first installing version 3.0 of the package manager software. In this example, if version 2.0 of the package manager software is installed on client 102, then update tool 104 can be configured to access version 3.0 of the package manager software from, for example, one or more package repositories 144 or other sources, unpack version 3.0, and install version 3.0 on package manager 110. After installation of version 3.0 on package manager 110, update tool 104 can access and install the available package update using version 3.0 of the package manager software.

Figure 4:
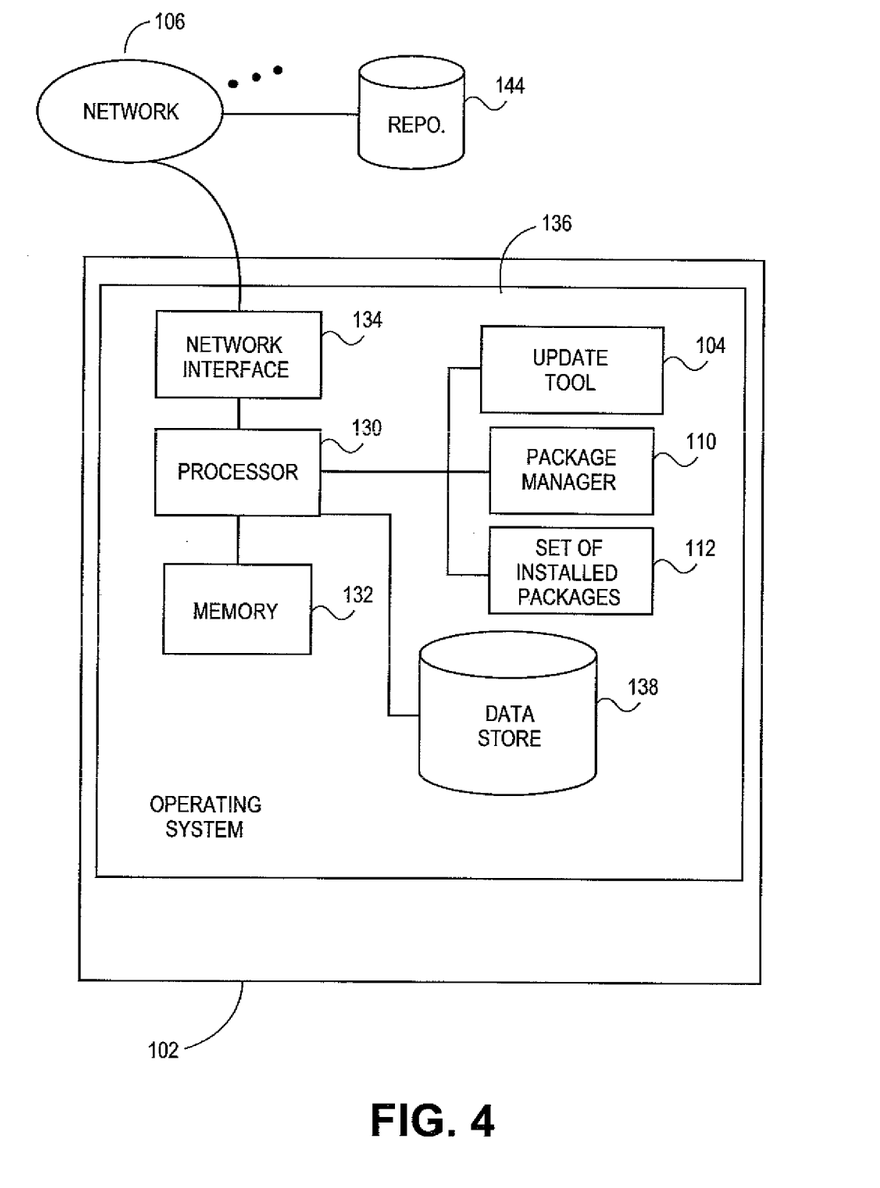
FIG. 4 illustrates exemplary hardware and other resources of a client machine that can be used in systems and methods for determining when to update a package manager software, according to various embodiments.

FIG. 4 illustrates an exemplary diagram of hardware and other resources that can be incorporated in a client 102 configured to update a package manager software, one or more set of installed software packages 112, and other resources associated with package manager 110 and other components. As shown, client 102 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 also communicates with data store 138, such as a database stored on a local hard drive. Processor 130 can further communicate with a network interface 134, such as an Ethernet or wireless data connection, which in turn communicates with one or more networks 106, such as the Internet or other public or private networks. Processor 130 can also communicate with update tool 104, package manager 110, and/or other resources to execute control logic and control the updating, unpacking, installation, analysis and management of package manager software and their associated processes. Other configurations of client 102, including processor and memory resources, associated network connections, and other hardware and software resources are possible.

Figure 5:
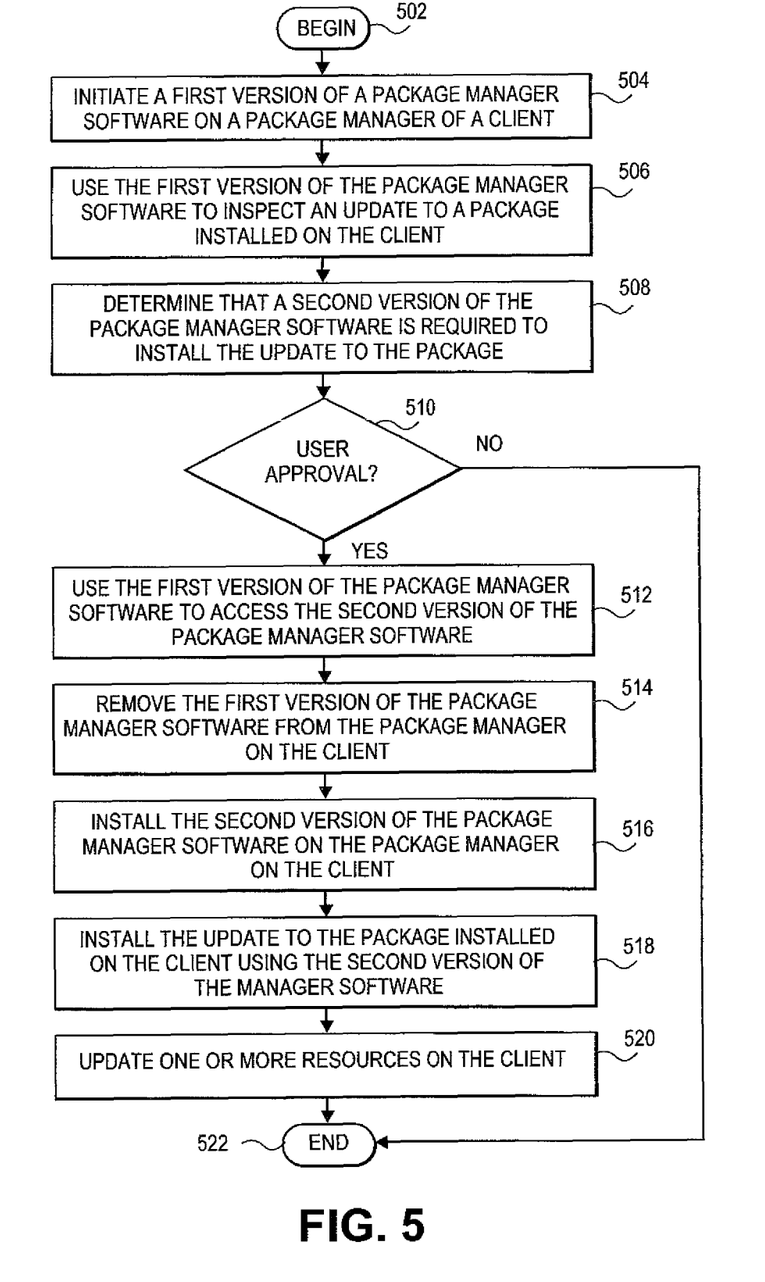
FIG. 5 illustrates a flowchart of software package update management that can be used in systems and methods for determining when to update a package manager software, according to various embodiments.

FIG. 5 illustrates overall processing to update a package manager software, according to various embodiments. In 502, processing can begin. In 504, a first version of a package manager software can be initiated on package manager 110 of client 102. In 506, the first version of the package manager software can be used to inspect an update to a package installed on client 102. In embodiments, the update to the package installed in client 102 can be inspected by extracting a required package manager version number from one or more package repositories 144 and/or another site or source. In 508, update tool 104 or other logic can determine that a second version of the package manager software is required to install the update to the package. In embodiments, the extracted required package manager version number of the update (here, the second version) can be compared to the installed version of the package manager software (here, the first version).

In 510, a user of client 102 can be notified that the package manager software needs to be updated. In embodiments, the user of client 102 can be notified via a communication, via an interface such as a graphical user interface (GUI), or via other methods. In embodiments, the user can provide approval to proceed with the updating of the package manager software. If the user does not provide approval, processing can proceed to end at 520. If the user provides approval, processing can proceed to 512, in which the first version of the package manager software can be used to access the second version of the package manager software. In embodiments, package manager 110 can access the second version of the package manager software from one or more package repositories 144. Further, in embodiments, the second version of the package manager software can be encompassed in a package.

In 514, the first version of the package manager software can be removed or uninstalled from package manger 110. In embodiments, prior versions or outdated files of other resources associated with the first version of the package manager software can be uninstalled or otherwise removed from client 102. In 516, the second version of the package manager software can be unpacked and installed on package manager 110 of client 102. In 518, the update to the package installed on the client can be installed using the second version of the package manager software. In embodiments, package manager 110 can access the update to the package from one or more package repositories 144. Further, in embodiments, the update to the package can be encompassed in the same package that contained the second version of the package manager software, or other packages.

In 520, one or more resources on client 102 can be updated. For example, the one or more resources can be used to support operation of or maintain compatibility with the second version of the package manager software or the updated package, and can be any hardware or software associated with client 102 such as, for example, an operating system, application, interface, memory, peripheral, media card, and other hardware or software. In embodiments, update tool 104 can facilitate the updating of the one or more resources. For example, update tool 104 can install a patch on an operating system of client 102. Further, for example, update tool 104 can communicate with a remote download server to download an update to an application installed on client 102 and install the update to the application. In 522, processing can return to a prior processing point, jump to a further processing point, or end.

The foregoing description is illustrative, and variations in configuration and implementation may occur to persons skilled in the art. For example, while embodiments have been described in which a unitary package manager 110 is configured to control package manager software update activity, in embodiments, multiple applications or software can interact to control the downloading, unpacking, installation, testing, and other management of package manager software updates. Further, while embodiments have been described in which a package manager software can be updated from one version to another, it should be understood that the systems and methods can replace one package manager with another package manager, such as, for example, replacing the "up2date" package manager available from Red Hat™, Inc. with the "yum" package manager available from Red Hat™, Inc. While embodiments have been described in which package manager software update activity is conducted on one client 102, in other embodiments, multiple local or remote targets, clients, and/or other machines can register to package manager 110 and/or other logic or resources to receive or perform package manager software update activity. Similarly, while embodiments have been described in which one diagnostic database 116 is accessed by update tool 104, package manager 110, and/or other logic to identify causes of potential faults or issues, in other embodiments, multiple diagnostic or debugging databases can be used. Other resources described as singular or integrated can in embodiments be plural or distributed, and resources described as multiple or distributed can in embodiments be combined. The scope of the present teachings is accordingly intended to be limited only by the following claims.

What is claimed is:

1. A method, comprising:
inspecting, using a first version of a package manager software, an update to a package prior to installing the update to the package, wherein the package and the package manager software are installed on a client, wherein inspecting the update to the package comprises extracting a version of the package manager software required to install the update to the package from a package repository;

determining, by a processor of the client, in view of the inspection, a dependency between the update to the package and the package manager software, the dependency to indicate that a second version of the package manager software is required to install the update to the package, wherein determining the dependency between the update to the package and the package manager software comprises comparing the second version of the package manager software with the first version of the package manager software; and updating the package manager software from the first version to the second version prior to installing the update to the package, wherein updating the package manager software from the first version to the second version comprises:

accessing, using the first version of the package manager software, a package comprising the second version of the package manager software;

removing the first version of the package manager software from the client; and     installing the second version of the package manager software on the client, wherein the first version of the package manager software is removed after the second version of the package manager software is installed.

2. The method of claim 1, further comprising installing, using the second version of the package manager software, the update to the package on the client.

3. The method of claim 2, wherein the package manager software is updated and the update to the package is installed by an update tool associated with a package manager.

4. The method of claim 1, wherein the package comprising the second version of the package manager software further comprises files associated with installing the update to the package.

5. The method of claim 1, further comprising notifying a user of the client that the second version of the package manager software is required to install the update to the package.

6. The method of claim 1, wherein the second version of the package manager software is more than one iteration from the first version of the package manager software.

7. The method of claim 1, further comprising:

determining at least one resource on the client for which an update is necessary to support the second version of the package manager software; and     updating the determined at least one resource on the client.

8. A system, comprising:

an update tool to interface with a package manager; and a processor communicatively coupled to the update tool to:

inspect, using a first version of a package manager software, an update to a package prior to installing an update to the package, wherein the package and the package manager software are installed on a client, wherein when inspecting the update to the package, the processor is to extract a version of the package manager software required to install the update to the package from a package repository;

determine, in view of the inspection, a dependency between the update to the package and the package manager software, the dependency to indicate that a second version of the package manager software is required to install the update to the package, wherein when determining the dependency between the update to the package and the package manager software, the processor is to compare the second version of the package manager software with the first version of the package manager software; and     update the package manager software from the first version to the second version prior to installing the update to the package, wherein the package manager software is further to:

access, using the first version of the package manager software, a package comprising the second version of the package manager software;

remove the first version of the package manager software from the client; and         install the second version of the package manager software on the client, wherein the first version of the package manager software is removed after the second version of the package manager software is installed.

9. The system of claim 8, wherein the processor to install, using the second version of the package manager software, the update to the package on the client.

10. The system of claim 9, wherein the package manager software is updated and the update to the package is installed by an update tool associated with the package manager.

11. The system of claim 8, wherein the package comprising the second version of the package manager software further comprises files associated with installing the update to the package.

12. The system of claim 8, wherein the processor further to notify a user of the client that the second version of the package manager software is required to install the update to the package.

13. The system of claim 8, wherein the second version of the package manager software is more than one iteration from the first version of the package manager software.

14. The system of claim 8, wherein the processor further to:

determine at least one resource on the client for which an update is necessary to support the second version of the package manager software; and     update the determined at least one resource on the client.

15. A non-transitory computer readable medium comprising instructions to cause a processor to:

inspect, using a first version of a package manager software, an update to a package prior to installing the update to the package, wherein the package and the package manager software are installed on a client, wherein the package manager software is further to extract a version of the package manager software required to install the update to the package from a package repository;

determine, by the processor of the client, in view of the inspection, a dependency between the update to the package and the package manager software, the dependency to indicate that a second version of the package manager software is required to install the update to the package, wherein the package manager software is further to compare the second version of the package manager software with the first version of the package manager software; and     update the package manager software from the first version to the second version prior to installing the update to the package, wherein the package manager software is further to:

access, using the first version of the package manager software, a package comprising the second version of the package manager software;

remove the first version of the package manager software from the client and install the second version of the package manager software on the client, wherein the first version of the package manager software is removed after the second version of the package manager software is installed.

* * * * *